United States Patent [19]
Sutherland

[11] Patent Number: 5,825,605
[45] Date of Patent: Oct. 20, 1998

[54] ELECTROSTATIC SHOCK PREVENTION DEVICE FOR USE IN VEHICLES

[76] Inventor: Colin A. Sutherland, 17 Leetom Crescent, Nepean, Ontario, Canada, K2J 1E3

[21] Appl. No.: 910,461

[22] Filed: Jul. 11, 1997

[30] Foreign Application Priority Data

Sep. 27, 1996 [CA] Canada ................................. 2186644

[51] Int. Cl.⁶ .................................................. H05F 03/02
[52] U.S. Cl. ........................................... 361/216; 361/220
[58] Field of Search .................... 361/212, 216, 361/217, 220

[56] References Cited

U.S. PATENT DOCUMENTS

| | | | |
|---|---|---|---|
| 1,744,004 | 1/1930 | Hunt | 361/217 |
| 2,614,155 | 10/1952 | Lippy | 361/216 |
| 2,714,181 | 7/1955 | Azbill | 361/216 |
| 2,751,523 | 6/1956 | Adams | 361/216 |
| 2,802,148 | 8/1957 | Allder | 361/216 |
| 2,858,482 | 10/1958 | Nutter | 361/216 |
| 3,099,774 | 7/1963 | Crane | 361/216 |
| 3,378,726 | 4/1968 | Lankow | 361/216 |
| 4,633,364 | 12/1986 | Nakamura et al. | 361/216 |
| 5,331,502 | 7/1994 | Bakhoum | 361/212 |
| 5,518,055 | 5/1996 | Teeple et al. | 152/152.1 |

FOREIGN PATENT DOCUMENTS 2-68897(A) 3/1990 Japan .................................... 361/216

Primary Examiner—Fritz Fleming

[57] ABSTRACT

A driver or passenger in a vehicle will often experience an electrostatic shock on exiting the vehicle. The invention solves this problem in a simple but effective manner by providing an appropriate discharge path. The finger recess in the door handle is lined with a conductive material which is connected to the metallic structure of the door, or otherwise to the vehicle body. This measure prevents the accumulation of an electric potential between the driver or passenger and the vehicle so that no discharge occurs.

6 Claims, 6 Drawing Sheets

ELECTROSTATIC SHOCK PREVENTION DEVICE FOR USE IN VEHICLES

FIELD OF THE INVENTION

This invention relates to a device for the prevention of electrostatic shocks received by the driver or passengers on exiting a vehicle.

BACKGROUND OF THE INVENTION

It is common for a driver (the term "driver" will be understood to mean "driver or passenger" for the purposes of this description) in a vehicle to receive an electrostatic shock on exiting the vehicle. The problem occurs more frequently in periods of low humidity, especially during winter, and the severity of the shock varies from imperceptible to very disturbing, depending upon the conditions, the vehicle upholstery, and the clothing worn by the victim. The shock generally occurs when the driver is standing on the ground next to the vehicle and turns to close the door. A spark discharge occurs between the hand and the vehicle door, which is electrically connected to the rest of the vehicle body.

Previous attempts at solving this problem have relied on providing a discharge path from the vehicle body to ground, for example by using a hanging conductive strap or chain which removes any electrostatic charge acquired by the vehicle body with respect to ground potential. More recently, tires having conductive material in their walls as described, for instance, in U.S. Pat. No. 5,518,055 have been introduced. These measures are inadequate because they do not address the entire problem. The electrostatic charge of concern here is produced by the act of sliding across the seat on the way out of the vehicle. The potential difference exists between the driver and the vehicle body, and the potential of these objects with respect to ground is only of secondary importance.

The sequence of events on leaving a vehicle is as follows: the driver operates the door latch and pushes the door ajar. He (or she) transfers his (or her) hand to the interior door handle or recess to provide better control of the door opening and to avoid bumping the door on adjacent vehicles or other objects. The interior door handle or recess is generally made of electrically insulating materials. The driver slides sideways over the seat upholstery and swivels, places one foot on the ground, pushes the door further open, places the other foot on the ground and attains a standing position. He then turns to close the door, either by the exterior handle or by the outer rim of the door itself. This is the first point in the sequence where he comes into contact with the electrically conductive structure of the vehicle, and this is where the shock occurs.

The electrostatic charge is generated by the act of sliding over the upholstery, and can be removed by providing a discharge path during this period.

SUMMARY OF THE INVENTION

The shock can be prevented by ensuring that a discharge path exists between the driver and the vehicle body throughout the exit sequence described in the previous section. The most effective and least obtrusive means of providing a discharge path is to line the recess in the door handle with conductive material, and to connect this material electrically to the vehicle body (usually to the metallic door structure). As is common practice in electrostatic charge management, a fairly high resistivity material is adequate since the amount of charge is quite small, and a conductive plastic or metallized surface may be used. Furthermore, a high resistance path of, for instance, 100 megohms will limit any discharge that occurs when first touching the handle, making it imperceptible to the driver.

The invention may be summarized as a means for providing an electrically conducting path between the vehicle body and the natural resting place of the driver's hand while opening the door and exiting the vehicle.

DETAILED DESCRIPTION OF THE INVENTION

Figure 1:
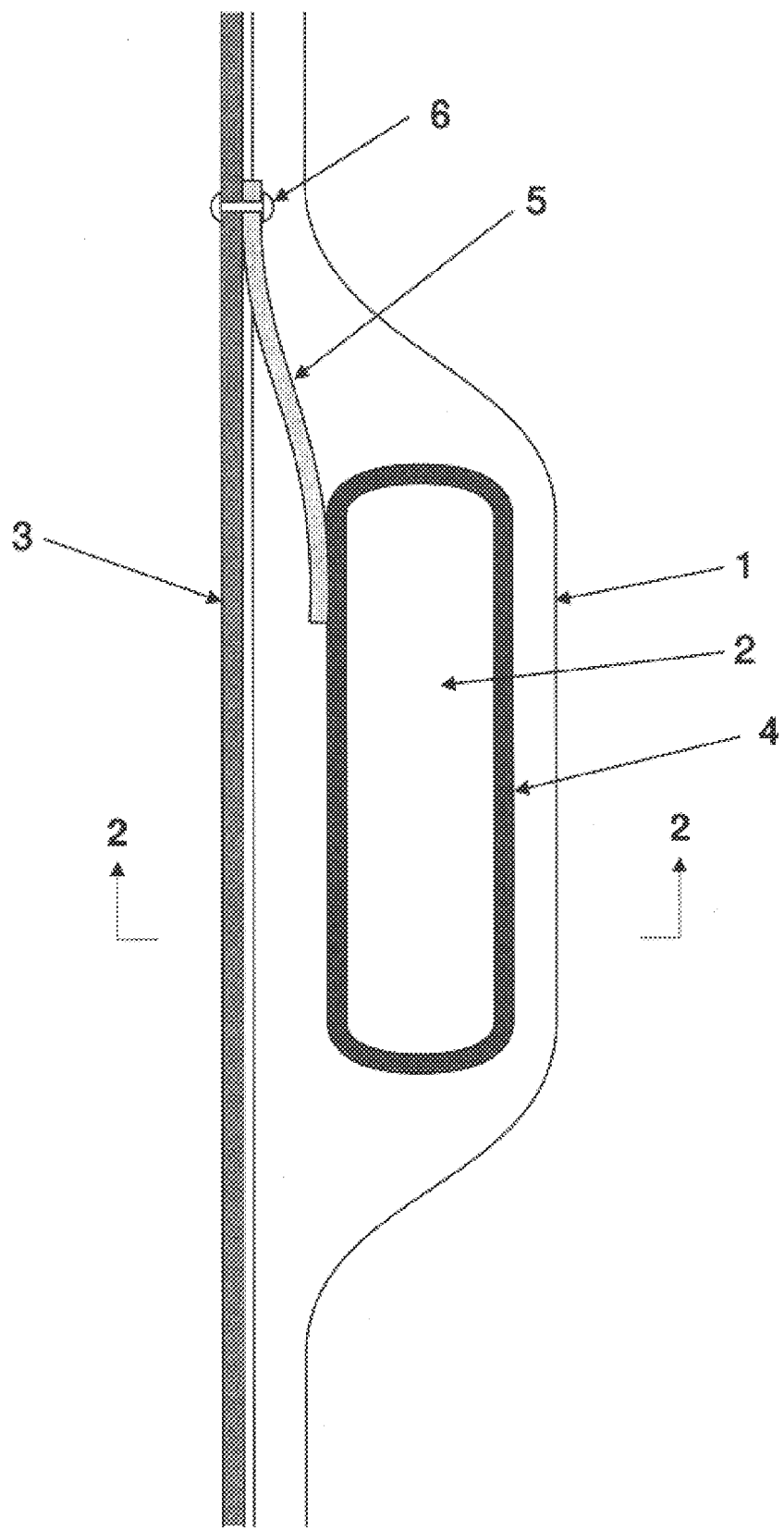
FIG. 1 shows the preferred embodiment of the invention in plan view.
Figure 2:
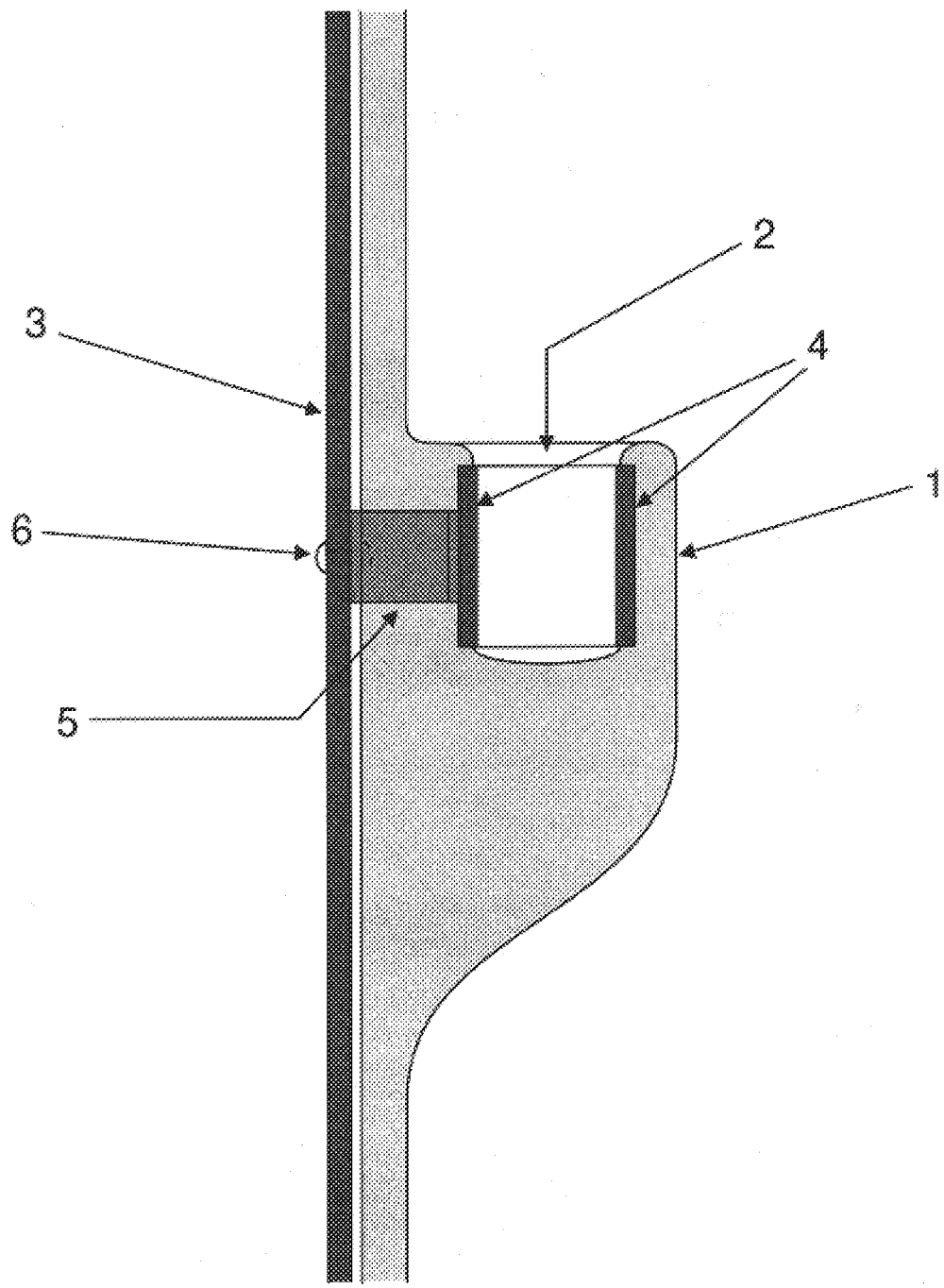
FIG. 2 shows a sectional view in the direction 2—2 shown in FIG. 1.
Figure 3:
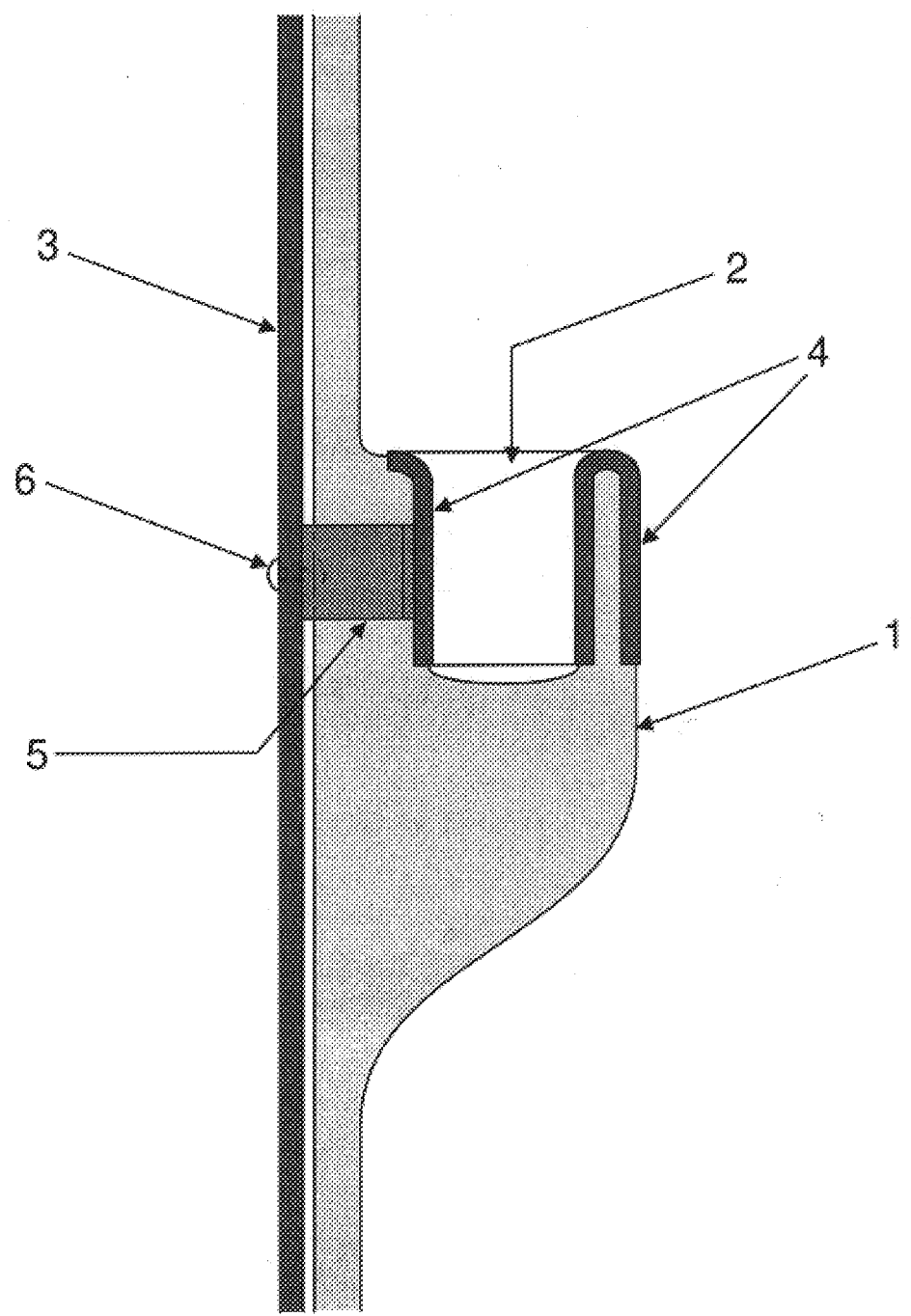
FIG. 3 shows an alternative embodiment of the invention in which the conductive surface layer extends over more of the surface of the door handle than in FIG. 2.

FIG. 1 shows one embodiment of the invention, in plan view, and FIG. 2 shows the same embodiment in a sectional view in direction 2—2 as indicated in FIG. 1. A vehicle interior door handle 1 having a finger recess 2 is attached to the metal inner structure 3 of the vehicle door in the conventional manner. The shape and composition of these items will vary in accordance with the requirements of styling and comfort. A conductive surface layer 4 is applied to the periphery of the finger recess 2, and in some implementations this may extend over more or less of the surface of the door handle 1 than is suggested in FIGS. 1 and 2, as shown in FIG. 3. A conductive strap 5 is electrically connected to the conductive surface layer 4 and is bonded to the metal inner structure 3 by means of an eyelet 6.

The conductive surface layer 4 may be provided by a layer of conductive plastic, metallization or other means such as those used for electrostatic discharge protection of electronic devices and circuits, and familiar to those skilled in the art. The requirements are a combination of electrical conductivity with all the usual attributes of a vehicle's interior features such as the ability to be molded into compound curves, availability in a range of colors, attractive surface texture, resistance to temperature extremes and high humidity, and mechanical strength. In some implementations the handle 1 itself may be constructed of conductive material rather than having a separate conductive layer applied externally.

Figure 4:
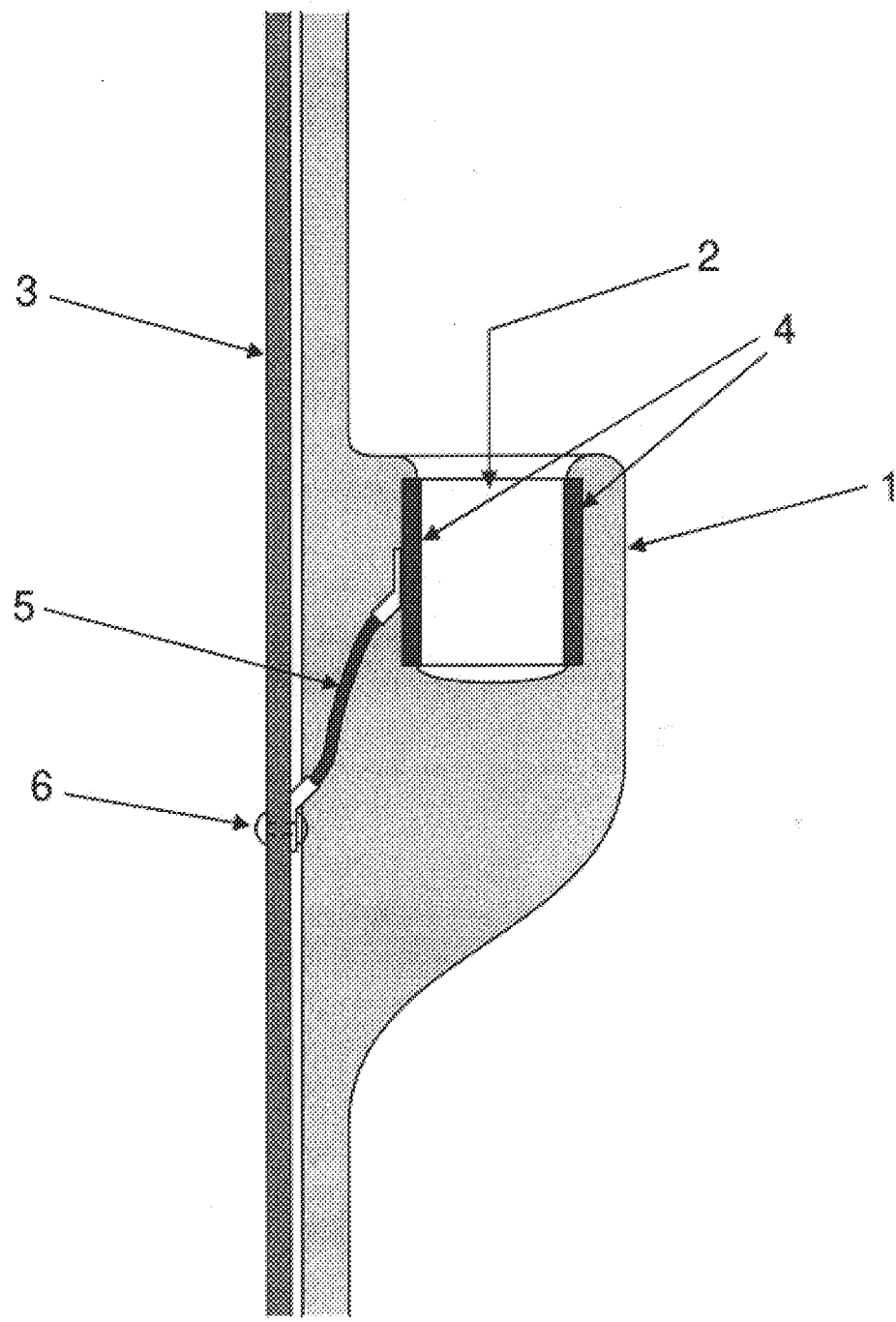
FIG. 4 shows the use of a wire rather than a strap to make the connection between the conductive surface layer and the metal inner structure of the vehicle door.

The conductive strap 5 may be made of the same conductive material as the conductive surface layer 4, or it may be a different material. It may be a continuation of the same material without a distinct boundary, or it may be fabricated of an entirely different material such as a metal wire that is bonded electrically to the conductive surface layer 4 as shown in FIG. 4. It may be routed along the surface of the door handle 1, or it may be concealed within it. The combined electrical resistance from the point of contact with the driver's fingers to the vehicle body is a design parameter that may vary over a wide range. A total resistance of up to 100 megohms is considered desirable to permit imperceptible removal of any charge that may have accumulated before touching the door handle 1.

The means for bonding the conductive strap 5 to the metal inner structure 3 may be by means of an eyelet 6, or alternatively a rivet, bolt, clamp or other suitable hardware may be used. In cases where the door handle 1 is fabricated from a conductive material and no separate conductive strap 5 exists, the normal means of attachment of the door handle 1 to the metal inner structure 3 may provide an adequate electrical connection without requiring any additional measures.

Figure 5:
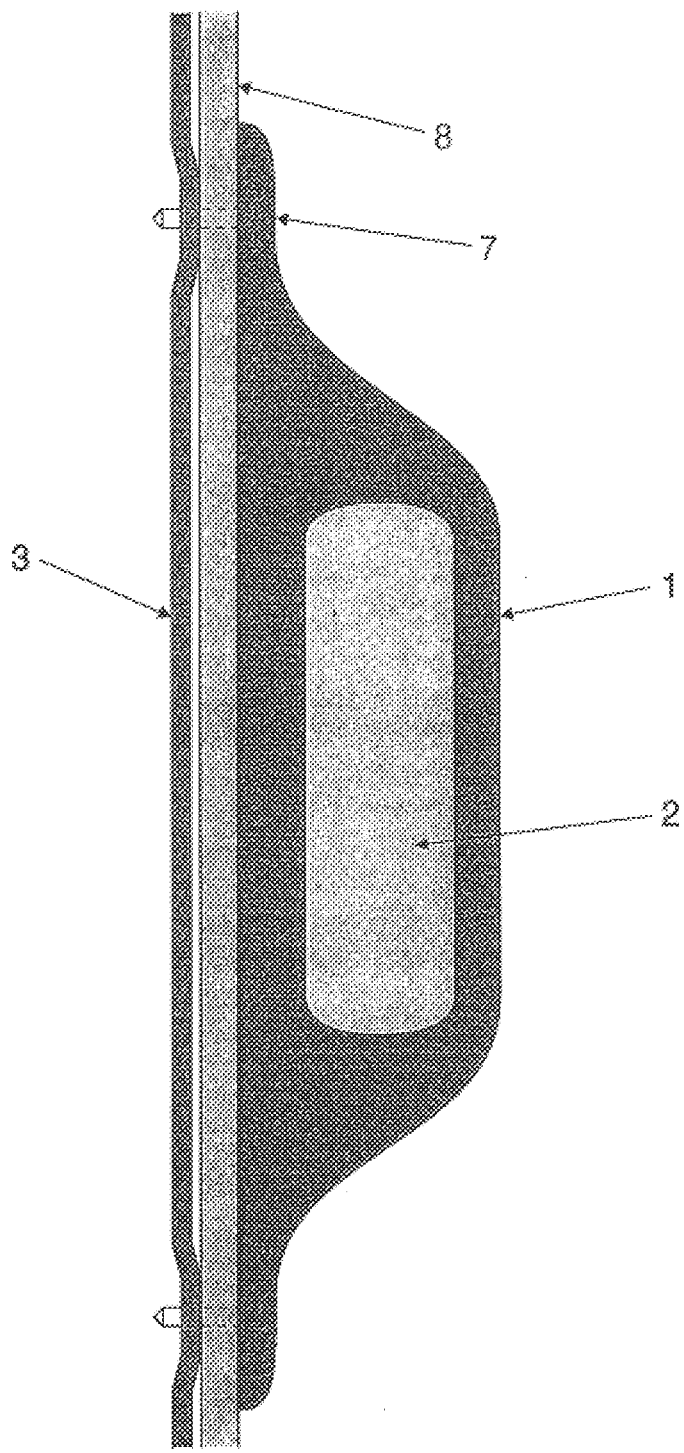
FIG. 5 shows an alternative embodiment in which the electrically conductive door handle is connected directly to the metal structure of the door without the use of a separate conductive strap.

The latter method of electrical bonding is illustrated in FIG. 5, in which the electrically conductive fasteners 7 are shown passing through the decorative interior panel 8 before being threaded into, or otherwise attached to, the metal inner door structure 3.

Figure 6:
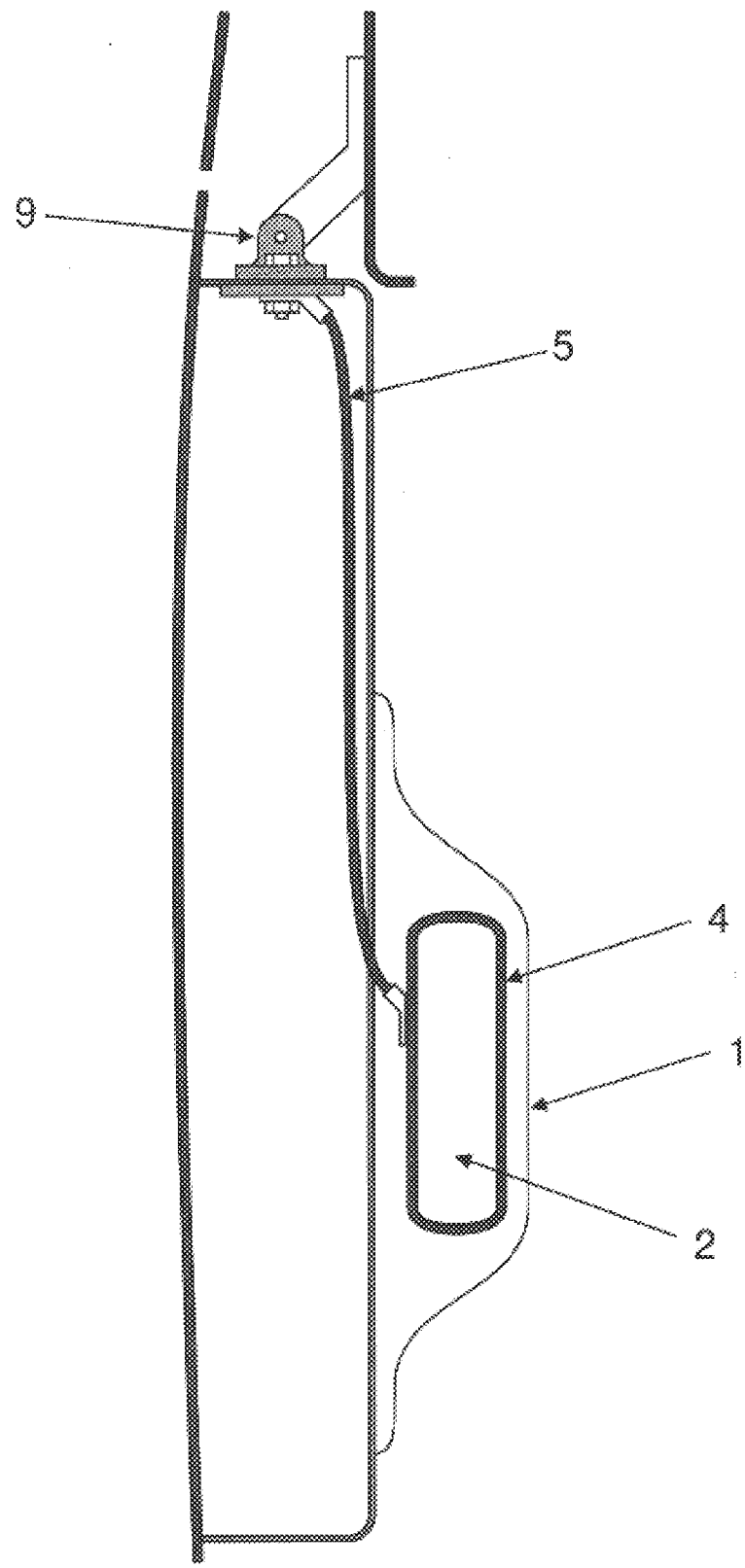
FIG. 6 shows an alternative embodiment suitable for use in vehicles having a nonconducting door structure.

FIG. 6 shows the implementation needed in the case of vehicles having a non-conducting door. The conductive strap 5 is connected directly to the door hinge 9 to provide an electrically conductive path between the conductive surface layer 4 and the metallic frame of the vehicle.

The embodiments of the invention in which an exclusive property or privilege is claimed are defined as follows:

1. An electrostatic shock prevention device comprising:
   a. means for providing an electrically conductive surface within and/or around each door handle or finger recess associated with each passenger door of a vehicle, wherein the electrically conducting surface comprises a conductive plastic strip within and/or around the finger recess of the door handle, and
   b. means for providing an electrically conductive path between said means for providing an electrically conductive surface within and/or around each door handle or finger recess and the metallic frame of the vehicle.

2. A device as set forth in claim 1 in which the electrically conductive path between the electrically conductive surface and the metallic frame of the vehicle is provided by a conductive plastic strip electrically connected to the metal inner structure of the vehicle door.

3. A device as set forth in claim 1 in which the electrically conductive path between the electrically conductive surface and the metallic frame of the vehicle is provided by a metal wire, strip or structural member electrically connected to the metal inner structure of the vehicle door.

4. A device as set forth in claim 1 in which the door handle is fabricated of, or is impregnated with, electrically conducting material, removing the need for an external conductive layer or coating.

5. A device as set forth in claim 4 in which the electrically conductive door handle is connected directly to the metal structure of the door without the need for a separate conductive strap.

6. A device as set forth in claim 1 or claim 4 in which the means for providing an electrically conductive path between an electrically conductive surface within and/or around each door handle or finger recess and the metallic frame of the vehicle is connected directly to the door hinge, in order to provide an electrically conductive path between said electrically conductive surface within and/or around each door handle or finger recess and the metallic frame of the vehicle in vehicles having a non-conducting door structure.

* * * * *